United States Patent

[11] 3,634,102

| [72] | Inventors | William D. Paynter;<br>Elwood W. Kielsmeier, both of Madison, Wis. |
|---|---|---|
| [21] | Appl. No. | 765,982 |
| [22] | Filed | Oct. 8, 1968 |
| [45] | Patented | Jan. 11, 1972 |
| [73] | Assignee | Oscar Mayer & Company, Inc.<br>Chicago, Ill. |

[54] PREPARATION OF PACKAGED SLICED DRY SAUSAGE
2 Claims, No Drawings

[52] U.S. Cl. .................................................. 99/174,
99/107, 99/208
[51] Int. Cl. ........................................... B65b 25/06,
A23b 1/04
[50] Field of Search .............................. 99/174 P,
208, 109 P, 259, 107, 109, 176, 194, 175; 34/13, 6 Z

[56] References Cited
UNITED STATES PATENTS
2,346,232   4/1944   Piret .............................. 99/208

3,329,510   7/1967   Paynter et al. ................. 99/208 X

FOREIGN PATENTS
2,028     7/1869   Great Britain ................. 99/208
106,054   9/1898   Germany ........................ 99/208

*Primary Examiner*—Frank W. Lutter
*Assistant Examiner*—Robert Halper
*Attorney*—Grelst, Lockwood, Greenawalt & Dewey ABSTRACT: Dry sausage (e.g., hard salami) is stuffed, smoked and cooked in the usual manner. Then, instead of being placed in the drying room for the usual prolonged drying, the product is sliced to usual thickness, e.g. one-sixteenth to one-eighth of an inch. The slices are supported so as to be substantially fully exposed to air and then drying air is blown over the slices so as to reduce the residual moisture content to from about 25 to 50 percent in not more than about 3 hours. The dried slices are then hermetically sealed in oxygen free packages.

PREPARATION OF PACKAGED SLICED DRY SAUSAGE

This invention relates to innovations and improvements in the manufacture of sliced, table-ready, dry sausages packaged in hermetically sealed, oxygen free containers. More specifically, the invention relates to such improvements and innovations wherein after dry sausages have been smoked and cooked in the usual manner, they are sliced before undergoing appreciable drying, and then the slices are rapidly dried by blowing drying air over the exposed surfaces until the desired residual moisture content is obtained.

The term "dry sausage" is well-known in the sausage making art and used therein to identify such sausage items as hard salami, pepperoni and Genoa sausages. The conventional method of making dry sausages has remained essentially the same for many decades. Briefly, the initial steps consist of grinding the ingredients to form the batter, stuffing the batter into a casing, followed by smoking and cooking the whole sausages. Following these conventional sausage making steps, comes the additional step, in producing dry sausage, of slow drying the smoked and cooked sausages so as to reduce the total moisture content thereof from 25 to 50 percent and typically about 40 percent moisture content. In the conventional method, the moisture is removed from the unsliced cooked sausages by slow evaporation from the outer surfaces at air temperatures 50°–55° F. and relative humidities of 65–70 percent. This drying process requires from 10 to 100 days depending upon such condition as relative humidity, diameter of the sausages, and final moisture content. Mold growth tends to develop during the drying and is difficult to avoid completely. As the moisture evaporates from the outer surfaces of the sausages, the moisture from the center slowly migrates toward the outside resulting in final products having a moisture gradient from a high in the center to a low at the outer surface. Proteins on the surface tend to become denatured during the drying process and do not readily rehydrate, even after a period of equilibration of the product. This prevents equilibration of moisture throughout the final product and when sliced leaves a hard outer skin.

In addition to the foregoing disadvantages of the conventional drying procedure used in manufacturing dry sausages of the hard salami type, there is the substantial economic disadvantage of tying up substantial drying facilities and a large inventory of product in various stages of drying for relatively long periods. Another disadvantage is that of lack of flexibility in meeting unexpected demands. Because of the long times required to carry out the drying step it is not possible for the manufacturer to readily meet unexpected demands which his inventory will not satisfy. Accordingly, the sausage manufacturer finds it necessary to run short periodically, or to frequently have surpluses of dry sausage products for substantial periods.

In an effort to eliminate the prolonged drying, in the conventional process of manufacturing dry sausages it has heretofore been found that the smoked and processed sausages, before undergoing substantial drying, could be sliced and then the slices frozen and subjected to partial freeze-drying as set forth in U.S. Pat. No. 3,329,510 dated July 4, 1967. After the moisture content was reduced to the desired residual level the slices were packaged in substantially oxygen free containers and thereafter the residual moisture content became substantially uniformly distributed throughout the slices. While good quality product could be prepared by the freeze-drying technique and the freeze-drying operation carried out in periods of 1 hour or under, the process was inherently relatively expensive because of the cost of the relatively sophisticated equipment and the limited capacity thereof. Nevertheless, it was considered that the freeze-drying technique was necessary in order to carry out the substantial amount of drying necessary without adversely affecting the delicate nature of the product.

It was unexpectedly discovered in accordance with the present invention that the drying of the sliced sausages could be carried out without resorting to the freeze-drying technique by passing drying air for not more than about 3 hours over the slices and after the residual moisture content is reduced to the desired level the slices are promptly packaged in hermetically sealed, substantially oxygen-free, containers. The resulting product is comparable to that obtained by the freeze-drying technique disclosed in U.S. Pat. No. 3,329,510 or that produced by the conventional procedure involving days and weeks of slow drying.

Accordingly, the object of this invention, generally stated, is the provision of an improved method of processing dry sausages after they have been smoked and cooked so as to obtain a good quality product without following either the conventional prolonged drying in the unsliced condition or the prior freeze-drying technique in the sliced condition.

Certain more specific objects of the invention will in part be obvious and will in part appear hereinafter.

For a more complete understanding of the nature and scope of the invention reference may now be had to the following detailed description thereof wherein a preferred working example is set forth followed by statements of permissible variations.

EXAMPLE 1

Hard salami-type sausages were prepared, smoked and cooked in the well-known conventional manner using a commercial batter formulation. However, instead of next placing the sausages in a conventional drying room, they were taken right after smoking and cooking, and before they had undergone any appreciable drying, and sliced into 1/16-inch-thick slices that were 4 inches in diameter and the slices were placed in single layers in expanded metal trays. The trays were placed in a drying chamber or tunnel in which air was blown over both the upper and lower surfaces of the slices at a temperature of 45° F. (dry bulb) and 35° F. (wet bulb) and at a velocity of 1,500 feet per minute.

The slices were held in this drying airstream until the residual moisture content thereof reached 40 percent as determined by loss in weight on drying. This took approximately 60 minutes. The slices were then removed, stacked in 6 ounce stacks on metal lids and vacuum packaged under plastic film as set forth in U.S. Pat. No. 3,326,699 dated June 20, 1967. The packages were held under refrigeration at 38° F. for consumption.

EXAMPLE 2

The procedure of example 1 was followed. However, sausages were used that were smaller in diameter in that they had diameters of 1¼ inches and the drying airstream was at 55° F. (dry bulb) and 42° F. (wet bulb) and was blown over the slices at a velocity of 1,000 feet per minute. It required approximately 55 minutes to reduce the residual moisture content of the slices to 40 percent at which point they were shingled and vacuum packaged in plastic pouches using known equipment and manner. The packaged product was held at 38° F. until consumption.

After air drying in the foregoing examples the slices were much dryer at the surfaces than they were in the interiors. However, the surfaces were not denatured or tough and on being held in the packages equilibration of the moisture content in the individual slices readily occurs. The product produced under examples 1 and 2 compared favorably with hard salami produced from the same batter with the usual slow drying procedures.

The following permissible variations may be used in connection with the foregoing examples:
1. The slices may range in thickness from one thirty-second to one-fourth inch.
2. The residual moisture content may range from 25 to 50 percent but the preferred residual moisture content is from 35 to 40 percent.
3. The temperature of the drying air may range from 45° F. up to 65° F. (dry bulb) and the relative humidity thereof from 25 to 50 percent.

4. The dried products can be hermetically sealed in any air-impermeable packaging material, either flexible or rigid, and the containers either may be evacuated or flushed and filled with an inert gas such as nitrogen or carbon dioxide.

The following table sets forth data showing the effect of different drying conditions on drying yield, weight loss, sliced diameter loss, and moisture and protein analysis in carrying out the drying of the slices in accordance with the present invention.

TABLE I.—EFFECT OF DIFFERENT DRYING CONDITIONS ON DRYING YIELD, WEIGHT LOSS, SLICE DIAMETER LOSS AND MOISTURE AND PROTEIN ANALYSIS

| Drying conditions | Weight, pounds | | | Percent | | Averages of Tests I, II and III | | | |
| --- | --- | --- | --- | --- | --- | --- | --- | --- | --- |
| | Before drying | After drying | Loss | Loss | Yield | Diameter loss, in. | Moisture analysis, percent | Protein analysis, percent | Moist./prot. ratio |
| 65° F./50% RH | 1.02 | .94 | .08 | 8.2 | 91.8 | .03 | 47.5 | 17.6 | 2.7:1 |
| 65° F./25% RH | 1.02 | .73 | .29 | 28.8 | 71.2 | .34 | 33.2 | 22.1 | 1.5:1 |
| 45° F./50% RH | 1.04 | .92 | .11 | 10.9 | 89.1 | .08 | 46.4 | 18.4 | 2.5:1 |
| 45° F./25% RH | 1.02 | .84 | .18 | 17.9 | 82.1 | .19 | 41.0 | 19.6 | 2.1:1 |

What is claimed new is:

1. The method of making packaged, ready-to-eat dry sausage in sliced form which comprises, slicing dry sausage after the same have been smoked and cooked and before they have undergone appreciable drying into slices not exceeding approximately one-fourth inch in thickness, subjecting at least substantially all of both surfaces of said slices to a current of relatively dry cool air for not in excess of about 3 hours the temperature of which ranges between about 45° to about 65° F. and the relative humidity of which ranges from about 25 to about 50 percent until the moisture content of said slices is reduced to a residual moisture content of from about 25 to 50 percent by weight, and promptly hermetically sealing said slices in substantially oxygen-free packages.

2. The method of claim 1 wherein the residual moisture content of said slices is reduced to approximately 40 percent by weight.

* * * * *